United States Patent Office 2,899,457
Patented Aug. 11, 1959

2,899,457

PRODUCT AND PRODUCTION OF DIESTERS OF 2 - CARBOXYBICYCLO - [2.2.1] - HEPT - 5 - ENE-2-ACETIC ACID

Abraham Bavley, Brooklyn, and Bryce E. Tate, Kew Gardens, N.Y., assignors to Chas. Pfizer & Co., Inc., New York, N.Y., a corporation of Delaware No Drawing. Application January 15, 1957
Serial No. 634,151

6 Claims. (Cl. 260—468)

This invention relates to a valuable class of diesters, namely diesters of 2-carboxybicyclo-[2.2.1]-hept-5-ene-2-acetic acid which have been found to be particularly useful as plasticizers for vinyl polymers. In addition, this invention relates to the process for producing these diesters.

More particularly, the valuable products of the present invention are the adducts of cyclopentadiene and the diesters of itaconic acid, the adduct being of the formula:

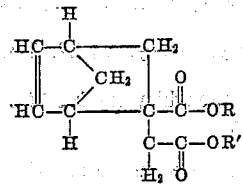

wherein "R," and "R'" are alkyl containing up to and including ten carbon atoms. Preferred diesters are those in which "R and "R'" contain from four to ten carbon atoms inclusive since they are of lower volatility than those in which "R" and "R'" contain from one to three carbon atoms inclusive.

The valuable compounds of the present invention have been found to be excellent plasticizers for vinyl chloride polymers or for copolymers containing vinyl chloride or vinylidene chloride as one of the comonomers. For the purpose of using these compounds as plasticizers, they may be admixed with the selected plastic in proportions of 5 to 50% by weight by conventional means such as a Banbury mixer at a temperature of, for example, about 140° C. A subsequently formed sheet of plastic is not only soft and pliable but is also exceedingly tough, the loss of plasticizer under normal conditions of use and exposure to heat and/or light being minimal.

In accordance with the process of the present invention, these valuable compounds are produced by heating a mixture containing from 0.5 to 2 moles of dicyclopentadiene per mole of itaconic acid diester at a temperature of from about 50 to about 180° C. for a time of at least two hours.

Although it is possible to employ cyclopentadiene by mixing the reactants in substantially equimolecular proportions and heating at a temperature from about 0 to about 50° C., the preferred process for making the compounds of the present invention utilizes dicyclopentadiene as a starting material. By the use of dicyclopentadiene, the difficulties of preparing cyclopentadiene from the commercially available dicyclopentadiene are avoided. In the case of preparing the nonesterified compounds corresponding to the diesters of the present invention, it is essential to start with cyclopentadiene in view of the fact that itaconic acid isomerizes at the temperatures required to provide cyclopentadiene in the reaction mixture by depolymerization of dicyclopentadiene. The foregoing is explained in concurrently filed copending application, Serial No. 634,153.

The itaconic acid diester starting material of the present invention wherein "R" and "R'" are identical may be made, as is known, by conventional esterification procedures. The itaconic acid diester starting material of the present invention wherein "R" and "R'" are dissimilar can also be prepared by methods known to those skilled in the art. For example, an equimolar portion of itaconic acid may be reacted with one mole of an alkanol containing up to ten carbon atoms to produce a β-carboalkoxy itaconate. This itaconate can, in turn, be converted to an acid chloride by reaction with thionyl chloride or other halogenating agents, and the resulting acid chloride converted to a diester by reaction with a second portion of a dissimilar alkanol containing up to ten carbon atoms. As stated above these diesters are of the formula:

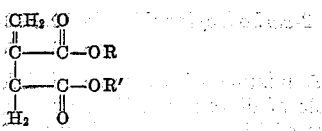

wherein "R" and "R'" are alkyl containing up to and including ten carbon atoms.

The reaction mixture of the present invention requires the presence of at least 0.5 mole of dicyclopentadiene per mole of itaconic acid diester in order to obtain a high yield of the desired end product and avoid the necessity of removing excess diester of itaconic acid after completion of the reaction. Excess dicyclopentadiene up to two moles may be tolerated in order to permit adequate cyclopentadiene to be formed during reaction at a rate permitting suitable reaction rates between the diester and cyclopentadiene. Upon completion of the reaction, excess dicyclopentadiene or its monomer may be removed by distillation.

The process of the present invention may be carried out at temperatures ranging from about 50 to about 180° C., the preferred temperature being from about 130–160° C. At temperatures within this range reaction times of at least about two hours are required in order to produce substantial yields of the desired end product. Reaction times of about 15 to 20 hours are preferred since they represent time conditions necessary to obtain highest yields compatible with the economies of heat requirements. Reaction times as high as 25 hours have been employed but are generally not necessary.

When employing the proportions, temperatures and reaction times set forth above and in the absence of a solvent, the yields obtained of high purity product are of the order of about 75 to 85%. This yield may be improved slightly by employing a polymerization inhibitor such as hydroquinone, diphenylamine, methylene blue, etc. In a preferred application of the invention the reaction is carried out in an inert atmosphere, for example, nitrogen, since the presence of the inert atmosphere decreases the possibility of side reactions.

For the purpose of recovering the desired end product of the present invention, the preferred method includes distillation of excess cyclopentadiene dimer or monomer under reduced pressure.

The foregoing description of the present invention and the following examples are for the purpose of illustration only and not limiting to the scope thereof which is set forth in the claims.

EXAMPLE I

*2-carbomethoxybicyclo [2.2.1]-hept-5-ene-2-acetic acid methyl ester*

A mixture of 2.0 moles of dimethyl itaconate, 1.5 moles of dicyclopentadiene and 1.0 g. of hydroquinone was heated in a nitrogen atmosphere at a temperature of 140 to 150°. The mixture was held at this temperature for seventeen hours and was then distilled. After a forerun of unreacted dicyclopentadiene, there was collected at 87 to 100° C. (0.6 mm.) 1.6 moles (80%) of the desired dimethyl ester; $n_D^{29}=1.4778$.

*Analysis.*—Calcd. for $C_{12}H_{16}O_4$: Carbon, 64.3; hydrogen, 7.19. Found: Carbon, 64.3; hydrogen, 7.16.

EXAMPLE II

*2-carbethoxybicyclo [2.2.1]-hept-5-ene-2-acetic acid methyl ester*

A mixture of 1.0 mole of α-ethyl-β-methyl-itaconate, 0.5 mole of dicyclopentadiene and 0.2 g. of hydroquinone was heated at 130° C. in a nitrogen atmosphere for fifteen hours. At the end of this time volatile material was removed by distillation and the desired product obtained in 75% yield by distillation in vacuo.

EXAMPLE III

*2-carbodecyloxybicyclo [2.2.1]-hept-5-ene-2-acetic acid decyl ester*

A mixture of 1.0 mole of didecyl itaconate and 1.0 mole of dicyclopentadiene was maintained at a temperature of 150° for twenty hours. At the end of this time volatile material was removed by distillation and the desired material obtained in 82% yield by distillation in vacuo.

EXAMPLE IV

*2-carbo-n-butoxybicyclo [2.2.1]-hept-5-ene-2-acetic acid-n-butyl ester*

A mixture of 0.31 mole of di-n-butyl itaconate, 0.50 mole of dicyclopentadiene and 0.5 g. of hydroquinone was maintained at a temperature of 140 to 150° C. in a nitrogen atmosphere. The mixture was held at this temperature for twenty hours and then distilled. At the end of this time unreacted dicyclopentadiene was removed by distillation; 42 to 60° C. (1 mm.). The desired product was obtained by distillation in vacuo in 80% yield; B.P. 146 to 148° C. (1 mm.), $n_D^{25}=1.4658$.

*Analysis.*—Calcd. for $C_{18}H_{28}O_4$: Carbon, 70.1; hydrogen, 9.15. Found: Carbon, 70.0; hydrogen, 9.01.

EXAMPLE V

A mixture containing 33% by weight of di-n-butyl itaconate and 67% by weight of a copolymer of vinyl chloride and vinyl acetate containing 95% of the chloride was fluxed on a rubber mill at a steam temperature of 140° C. It was observed that the mixture fluxed readily during mixing, although with considerable fuming. The di-n-butyl plasticizer was found to be compatible with the resin, and the product prepared was tough, pliable and essentially colorless.

What is claimed is:

1. A product of the formula:

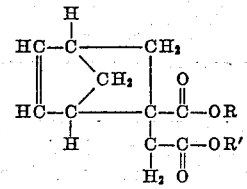

wherein "R" and "R'" are alkyl containing up to and including ten carbon atoms.

2. The product of claim 1 wherein "R" and "R'" are alkyl containing from four to ten carbon atoms inclusive.

3. 2 - carbomethoxybicyclo-[2.2.1]-hept-5-ene-2-acetic acid methyl ester.

4. 2-carbethoxybicyclo-[2.2.1]-hept-5-ene-2-acetic acid methyl ester.

5. 2 - carbodecyloxybicyclo-[2.2.1]-hept-5-ene-2-acetic acid decyl ester.

6. 2 - carbo-n-butoxybicyclo-[2.2.1]-hept-5-ene-2-acetic acid-n-butyl ester.

References Cited in the file of this patent

UNITED STATES PATENTS

| | | |
|---|---|---|
| 2,264,354 | Alder et al. | Dec. 2, 1941 |
| 2,311,261 | Staff | Feb. 16, 1943 |
| 2,752,361 | Robitschek et al. | June 26, 1956 |

OTHER REFERENCES

"Organic Reactions," IV, 14, 15, 55. J. Wiley, 1948.
Elsevier, 12A, 978 (1948).
Beilstein, 9, 578 (1949).